(12) United States Patent
Lee

(10) Patent No.: US 10,977,686 B2
(45) Date of Patent: Apr. 13, 2021

(54) METHOD FOR PROVIDING ADVERTISEMENT REPORTING SERVICE AND APPARATUS FOR PROVIDING ADVERTISEMENT REPORTING SERVICE

(71) Applicant: ADOP INC., Seoul (KR)

(72) Inventor: Won Sup Lee, Namyangju-si (KR)

(73) Assignee: ADOP INC., Seoul (KR)

( * ) Notice: Subject to any disclaimer, the term of this patent is extended or adjusted under 35 U.S.C. 154(b) by 91 days.

(21) Appl. No.: 16/300,128

(22) PCT Filed: Feb. 28, 2018

(86) PCT No.: PCT/KR2018/002449
§ 371 (c)(1),
(2) Date: Nov. 9, 2018

(87) PCT Pub. No.: WO2018/164410
PCT Pub. Date: Sep. 13, 2018

(65) Prior Publication Data
US 2019/0147489 A1   May 16, 2019

(30) Foreign Application Priority Data
Mar. 6, 2017 (KR) .................. 10-2017-0028184

(51) Int. Cl.
*G06Q 30/02* (2012.01)
*H04W 24/08* (2009.01)

(52) U.S. Cl.
CPC ......... *G06Q 30/0246* (2013.01); *G06Q 30/02* (2013.01); *G06Q 30/0277* (2013.01); *H04W 24/08* (2013.01)

(58) Field of Classification Search
CPC .................. G06Q 30/02–0277; H04W 24/08
See application file for complete search history.

(56) References Cited

U.S. PATENT DOCUMENTS 9,838,755 B1 * 12/2017 Kodige ................ H04N 21/812
2011/0110515 A1 * 5/2011 Tidwell ........... H04N 21/25891
380/200

(Continued)

FOREIGN PATENT DOCUMENTS

KR   10-2007-0115348 A   12/2007
KR   10-2009-0003413 A   1/2009

(Continued)

OTHER PUBLICATIONS

Zhai, Chengxiang, et a!. "A Study of Smoothing Methods for Language Models Applied to Ad Hoc information Retrieval" In ACM SIGIR Forum AMC (2017), vol. 51, No. 2, pp. 268-276.pp. (Year: 2017).*

*Primary Examiner* — Raquel Alvarez
(74) *Attorney, Agent, or Firm* — Novick, Kim & Lee, PLLC; Sang Ho Lee

(57) ABSTRACT

Disclosed is a method for providing an advertisement reporting service, the method includes acquiring inventory information corresponding to an advertising unit area of an advertising medium; providing an advertising code being issued from an advertising provider in response to the inventory information to the advertising medium; analyzing real-time impression information for the advertising unit area using traffic information generated according to a provision of the advertising code; and reporting the real-time impression information corresponding to the advertising unit area through the advertising medium.

17 Claims, 4 Drawing Sheets

(56) References Cited

U.S. PATENT DOCUMENTS

| | | | |
|---|---|---|---|
| 2012/0215645 A1 | 8/2012 | Chung et al. | |
| 2014/0324545 A1* | 10/2014 | Splaine | G06Q 30/0204 705/7.33 |
| 2014/0365296 A1 | 12/2014 | McDonnell et al. | |
| 2015/0088637 A1* | 3/2015 | Muguchi | G06Q 30/0246 705/14.45 |
| 2015/0170209 A1* | 6/2015 | Smith | G06Q 30/0267 705/14.64 |
| 2015/0178779 A1* | 6/2015 | Malone | G06Q 30/0261 705/14.58 |
| 2016/0080789 A1* | 3/2016 | Muller | H04N 21/44209 725/14 |
| 2016/0217147 A1* | 7/2016 | Boyle | G06F 16/183 |
| 2017/0169462 A1* | 6/2017 | Meredith | G06Q 30/0244 |

FOREIGN PATENT DOCUMENTS

| | | |
|---|---|---|
| KR | 10-2009-0106198 A | 10/2009 |
| KR | 10-2012-0033855 A | 4/2012 |
| KR | 10-1295086 B1 | 8/2013 |

\* cited by examiner

METHOD FOR PROVIDING ADVERTISEMENT REPORTING SERVICE AND APPARATUS FOR PROVIDING ADVERTISEMENT REPORTING SERVICE

The present invention relates to a method and an apparatus for providing service, more specifically to a method and an apparatus for providing an advertisement reporting service.

TECHNICAL FIELD

According to the media technology develops, the number of media that consumers are access to information has been increasing, and the kinds of devices that users hold for media playback are also becoming diverse. Media environment changes as the media technology develops, and accordingly, it is required to change the advertising strategies.

BACKGROUND ART

For example, since the advertising medium is got out of the passive form that can be transformed through traditional TV, newspapers, or electronic displays, the demand for Internet advertisement is continuously increased due to the proliferation of smartphones, the customized advertisement for selective viewing of media is also possible, and the mobile advertisement such as applications (in-app) and web advertisements (M-web) are also becoming common.

For advertisement to the variety of advertising mediums, web sites recently emerging as an advertising medium provide advertisements in connection with contents of the site of themselves. To this end, web sites may directly provide advertisements or engage in external advertisements, but most web sites are provided with the advertisements from advertising providers (or advertising agencies) to create a separate advertising area on the web page to impress by visitors.

Such advertising providers have various domestic and foreign companies such as Google. In recent years, and more and more providers have entered in Korean market to provide the advertisements on popular sites as global advertising providers have also entered the Korean market.

In this environment, the web site operating companies, as an advertising medium, contract with a plurality of advertising providers rather than a single provider for the specific advertising area, and periodically receive and impress the advertisements received from the plurality of advertising providers.

However, it is difficult for a web site operator, a manager, or advertisers to know in real time that which advertising, currently impressed on the web page, is provided by any advertising provider. In addition, although there are exposure priorities for each advertising provider that provides the advertisements in the advertising area, but there is no way for the operator or manager to check this on the web page.

Accordingly, there is no way to grasp the performance and analysis information of the advertisements impressed through the contracted advertising area in real time for each advertising provider.

For example, in case of manager reports provided individually by each advertising provider, it may provide the results of advertising costs depending on sales (or executions), impressions, and clicks. However, this is merely a report that is produced only as a result of impressing an advertisement requested by an advertising provider, it would not be appropriate for the web site to have advertisement from multiple advertisements providers by each advertisement area, as well as it is impossible to check in real time at the time of advertisement impression.

Because of these reasons, as a result, there is a problem that the manager or the advertiser of the advertising medium may not grasp accurately whether the advertisement is efficiently operated of each advertising provider and what is the priority and distribution of each advertising provider.

In addition, if the category of advertisements that the manager, advertiser, or operator does not want is impressed in a specific area, there is also a problem that of can not taking any action to check or block in real time that which advertising provider provides the corresponding advertisement.

DISCLOSURE

Technical Problem

The present invention has been made to solve the above problems, an object of the present is to provide a method and an apparatus for providing an advertisement reporting service, which provide real-time reporting for each advertising provider corresponding to an advertising area through an advertising area of an advertising medium by collecting, classifying, and analyzing segmented information by the advertising area of the advertising medium.

Technical Solution

According to an aspect of the present invention, there is provided a method for providing an advertisement reporting service, the method includes acquiring an inventory information corresponding to an advertising unit area of an advertising medium; providing an advertising code being issued from an advertising provider in response to the inventory information to the advertising medium; analyzing real-time impression information for the advertising unit area using traffic information generated according to a provision of the advertising code; and reporting the real-time impression information corresponding to the advertising unit area through the advertising medium.

According to other aspect of the present invention, there is provided an apparatus for providing an advertisement reporting service, the apparatus includes an inventory management unit for acquiring inventory information corresponding to an advertising unit area of an advertising medium; an advertising transmission management unit for providing an advertising code being issued from an advertising provider in response to the inventory information to the advertising medium; an analysis unit for analyzing real-time impression information for the advertising unit area using traffic information generated according to a provision of the advertising code; and a report providing unit for reporting the real-time impression information corresponding to the advertising unit area through the advertising medium.

According to another aspect of the present invention, there is provided a computer program for executing the method on a computer and a recording medium on which the program is recorded.

Advantageous Effects

According to an embodiment of the present invention, the method and the apparatus for providing an advertisement reporting service provide real-time reporting for each advertising provider corresponding to an advertising area with the layer manner through an advertising area of an advertising medium by collecting, classifying, and analyzing segmented information by the advertising area of the advertising medium.

Accordingly, the manager can very easily check the advertisement effect of each advertising provider corresponding to the advertisement area in real time through the layer on the web page corresponding to the advertisement area in the web page, thereby enabling the more effective operation of the web site advertisement.

Further, according to the preferred embodiment of the present invention, even if the category of advertisements that the manager, advertiser, or operator does not want is impressed in a specific area, the manager can take necessary action to check or block in real time that which advertising provider provides the corresponding advertisement.

DETAILED DESCRIPTION

Figure 1:
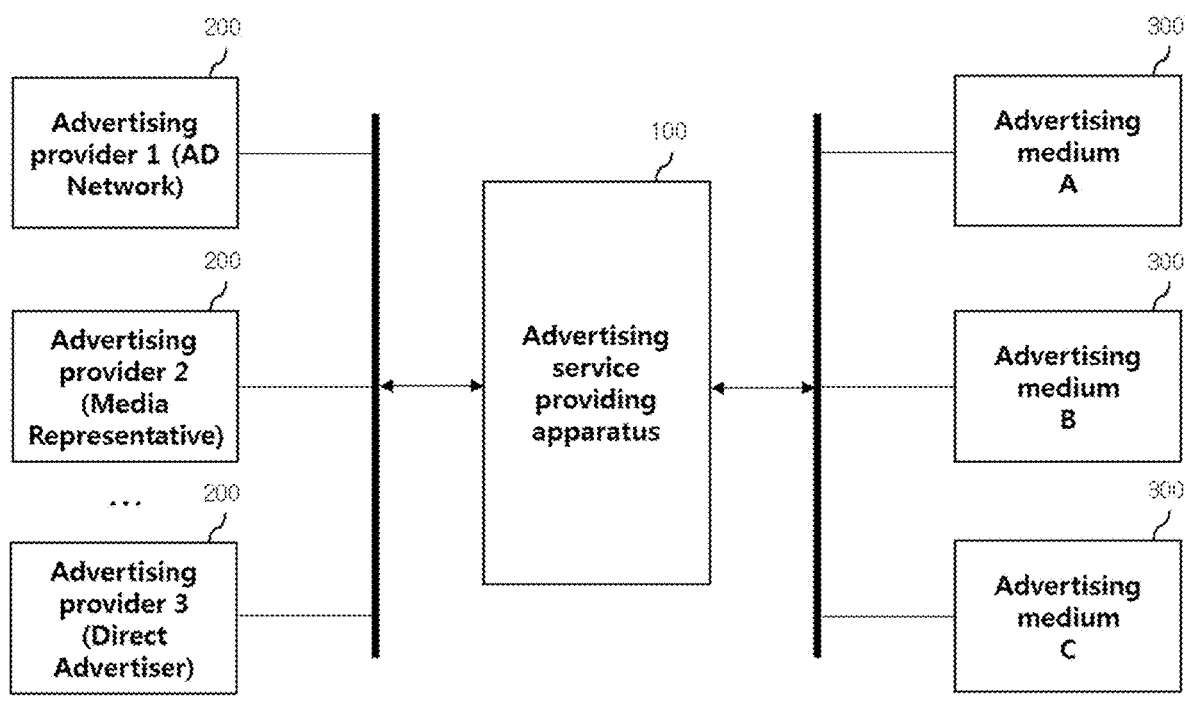
FIG. 1 is a conceptual diagram schematically showing an overall system according to a preferred embodiment of the present invention.

The following merely illustrates the principles of the invention. Therefore, those skilled in the art will be able to devise various apparatuses which, although not explicitly described or shown herein, embody the principles of the invention and are included in the concept and scope of the invention. Further, all of the conditional terms and embodiments listed herein are, in principle, intended to be understood only for the purpose of enabling the inventive concept to be understood, and not to be construed as being limited to the specifically recited embodiments and conditions.

It is also to be understood that the detailed description, as well as the principles, aspects and embodiments of the invention, as well as specific embodiments thereof, are intended to cover structural and functional equivalents thereof. It is also to be understood that such equivalents include all elements contemplated to perform the same function irrespective of the currently known equivalents as well as the equivalents to be developed in the future, i.e., the structure.

Thus, for example, it should be understood that the block diagrams herein represent conceptual views of exemplary circuits embodying the principles of the invention. Similarly, all flowcharts, state transition diagrams, pseudocode, and the like are representative of various processes that may be substantially represented on a computer-readable medium and executed by a computer or processor, whether the computer or processor is explicitly shown.

The functions of the various elements shown in the figures, including the functional blocks shown as a processor or similar concept, may be provided by use of dedicated hardware as well as hardware capable of executing software in connection with appropriate software. When provided by a processor, the functionality may be provided by a single dedicated processor, a single shared processor, or a plurality of individual processors, some of which may be shared.

Also, the explicit use of terms such as processor, control, or similar concepts should not be interpreted exclusively as hardware capable of running software, and may include, without limitation, digital signal processor (DSP) hardware, (ROM), random access memory (RAM), and non-volatile memory. Other hardware may also be included.

In the claims hereof, the elements represented as means for performing the functions described in the Detailed Description include all types of software, including, for example, a combination of circuit elements performing the function or firmware/microcode etc., and is coupled with appropriate circuitry to execute the software to perform the function. It is to be understood that the invention as defined by the appended claims is not to be construed as encompassing any means capable of providing such functionality, as the functions provided by the various listed means are combined and combined with the manner in which the claims require.

The above and other objects, features and advantages of the present invention will become more apparent from the following detailed description of the present invention when taken in conjunction with the accompanying drawings, in which: There will be. In the following description, well-known functions or constructions are not described in detail since they would obscure the invention in unnecessary detail.

Hereinafter, a preferred embodiment of the present invention will be described in detail with reference to the accompanying drawings.

FIG. 1 is a conceptual diagram schematically showing an overall system according to a preferred embodiment of the present invention.

The overall system for providing an advertisement according to an embodiment of the present invention includes an advertisement service providing apparatus 100, at least one advertising provider 200, and at least one advertising medium 300.

The advertisement service providing apparatus 100 may be connected to the advertising provider 200 and the advertising medium 300 via a wired/wireless network to perform mutual communication for providing an advertisement service.

Each of the networks may be a local area network (LAN), a wide area network (WAN), a value added network (VAN), a personal area network (PAN) a mobile radio communication network or a satellite communication network.

The advertising provider 200 may be various sever device, a network, or a terminal device for connecting to the advertisement service providing apparatus 100 for the purpose of advertisement operation such as providing the advertisements or limiting the impression of the provided the advertisement.

According to an embodiment of the present invention, the advertising provider 200 may be in a state in which the basic registration process is completed in the advertisement service providing apparatus 100.

For example, the advertising provider 200 may be a direct advertiser's terminal, a terminal or a server of a media representative affiliated with a plurality of advertisers, or may be a server of an advertisement network company that mediates a plurality of advertisement networks.

The advertisement service providing apparatus 100 may receive an advertising code corresponding to the advertisement content from the advertising provider 200 and deliver the advertising code to the advertising medium 300. The advertisement service providing apparatus 100 may index and manage inventory information corresponding to each advertising unit area of an advertising medium 300. Upon receiving the advertising code issuing request for each inventory from the advertising medium 300, the advertisement service providing apparatus provides the advertising code to the advertisement medium 300 by a predetermined advertisement impression order according to profitability and efficiency.

Meanwhile, an advertising medium 300 includes a media site for outputting various types of advertisements by accessing an advertising provider 200 using an advertising code and receiving appropriate advertising content from the advertising provider 200. For example, the advertising medium 300 may be implemented as a multi-device.

For example, the advertising medium 300 may include a web page corresponding to a particular URL, the web page may be provided through at least one device among a TV, a computer, a mobile phone, a smart phone, a smart pad, a laptop computer, a PDA (Personal Digital Assistants), a PMP (Portable Media Player), any one of the individual devices of virtual reality providing apparatuses, or a common device such as a kiosk or a stationary display device installed in a specific place.

Based on such a system configuration, the advertisement service providing apparatus 100 may be processed to be provided the advertisement reporting service based on the advertisement transmission and reception flows through the advertising medium 300.

To this end, the advertisement service providing apparatus 100 acquires the inventory information corresponding to the advertising unit area of the advertisement medium 300, provides advertising code to the advertising medium 300 in response to the inventory information, the advertising code being issued from the advertising provider 200, analyzes real-time impression information for the advertising unit area using the traffic information generated according to the advertising code, and reports the real-time impression information corresponding to the advertising unit area through the advertisement medium 300.

Accordingly, the advertisement service providing apparatus 100 according to the embodiment of the present invention collects, classifies, and analyzes the segmented information for each advertisement area of the advertising medium on the basis of the traffic information provides the real-time reporting by the advertising provider 200 corresponding to the advertising unit area through the advertising area of the advertising medium 300.

Particularly, according to the embodiment of the present invention, the reporting may be provided via the reporting layer, the operator checks the real-time impression information for each advertising area in real-time on an advertising medium 300 using the reporting layer interface.

Figure 2:
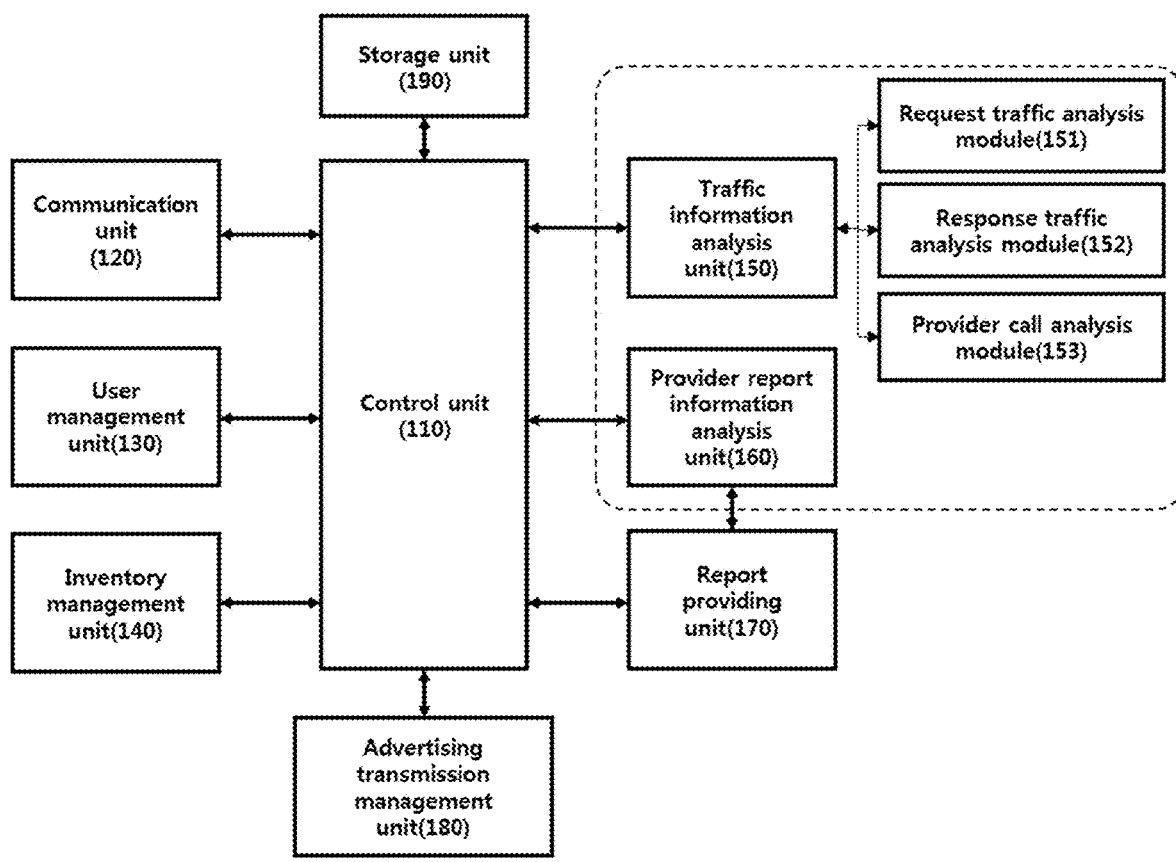
FIG. 2 is a block diagram illustrating an advertisement reporting service providing apparatus according to an exemplary embodiment of the present invention.

FIG. 2 is a block diagram illustrating an advertisement reporting service providing apparatus according to an exemplary embodiment of the present invention.

Referring to FIG. 2, an advertisement service providing apparatus 100 according to an exemplary embodiment of the present invention includes a control unit 110, a communication unit 120, a user management unit 130, an inventory management unit 140, a traffic information analysis unit 150, a provider report information analysis unit 160, a report providing unit 170, an advertisement transmission management unit 180, and a storage unit 190.

The control unit 110 generally controls the operation of each component and the execution of the function including user registration, advertisement data registration, distribution, advertisement medium information collection, traffic analysis, reporting collection, and reporting collection for advertisement service providing apparatus 100. For example, the control unit 110 may be implemented as a processor or a program for controlling all or a part of the advertisement transmission management and reporting functions for the advertisement medium 300.

The communication unit 120 may include one or more communication modules that enable wired and wireless communication between the advertisement service providing apparatus 100 and the wireless communication system including the mobile communication network or Internet network, or between the advertisement content management apparatus 100 and the plurality of advertising providers 200, or networks in which the advertising medium 300 is located. For example, the communication unit 120 may encode and modulate the received signal, and includes a modem for demodulating and decoding the received signal, and an RF front end for processing RF signal.

The user management unit 130 performs the user registration and account management at least one advertising provider 200 and the advertising medium 300 that uses the advertisement service providing apparatus 100.

The user management unit 130 receives the authentication information including at least one of account identification information or terminal identification information of the advertiser or the operator logged in from the advertising provider 200 or the advertising medium 300, and can register the user information by using the authentication information. Accordingly, the user management unit 130 registers and manages the advertisement medium information for the advertising medium 300 and the advertising provider information for each account.

The inventory management unit 140 receives the advertisement media information corresponding to the advertisement media 300 managed by the user management unit 130 and performs the inventory analysis using at least size information, area information, and location information, and obtains the inventory information corresponding to each advertisement medium 300 and outputs the inventory information to the analysis unit 150 and 160.

Here, the inventory information may form basic unit information of the reporting service according to the embodiment of the present invention. Accordingly, the inventory information may include information of the advertising unit area in which the advertisement is impressed in each advertising medium 300.

Depending on the registration of each inventory, the advertising medium 300 may request the advertising code for each advertising area corresponding to the inventory, the advertisement transmission management unit 180 transmits the advertising code for each advertising provider 200 according to a predetermined priority to the advertising medium 300 in response to the request.

Here, the advertising code may include code information for requesting the advertisement from the advertising medium 300 to the service providing apparatus 100

Accordingly, the advertisement medium 300 transmits an advertisement request based on the advertising code to the advertisement service providing apparatus 100 in the advertising unit area, the advertisement service providing apparatus 100 may provide advertisement provider access information corresponding to the advertisement request as response information to the advertising medium 300. The advertising medium 300 may provide advertisements (banner, images, etc.) of the advertising provider 200 accessed according to the access information to consumers through the web page or the like.

Meanwhile, the analysis units 150 and 160 includes at least one or more analysis modules for analyzing the real-time impression information for the advertisement area of the advertisement medium 300 using the traffic information generated according to the provision of advertising code.

For this purpose, the analysis unit may include traffic information analysis unit 150 and a provider report information analysis unit 160, the traffic information analysis unit 150 may include a request traffic analysis module 151, a response traffic analysis module 152, and a provider call analysis module 153.

The traffic information analysis unit 150 analyzes the real-time impression information based on the traffic information according to the advertisement request and the providing flow.

According to the advertisement request and the providing flow, the advertisement transmission management unit 180 of the advertisement service providing apparatus 100 receives advertising request based on the advertising code from the advertising medium 300, predetermined connection information (or advertisement call address check information) according to the advertisement request is provided to the advertising medium 300. The advertising medium 300 calls the corresponding advertisement information in the advertisement provider 200 according to the advertising code or the registered advertisement call address, the advertising provider 200 may provide the advertisement information in response to the call to the advertising medium 300. If there is no advertisement to be transmit to the advertising provider 200, and the advertisement request may be transmitted from the advertisement service providing apparatus 100 again in the advertising medium 300 having check result.

Accordingly, the traffic information analysis unit 150 processes each traffic analysis according to the flow to analyze the real-time impression information corresponding to the advertising unit area. To this end, the traffic information analysis unit 150 includes the request traffic analysis module 151 for analyzing the advertisement request traffic from the advertisement medium 300, a response traffic analysis module 152 for analyzing advertisement response traffic according to the advertisement request, and a provider call analysis module 153 for analyzing advertisement call traffic for the advertising provider 200.

The traffic information analysis unit 150 cumulatively collects the traffic information corresponding to the advertising unit area analyzed from each module through separate log storage, and can be used as a variable in generating the real-time impression information. For example, the traffic information analysis unit 150 stores the cumulative number of request traffic, the number of response traffic, and the number of call traffic of the advertising provider by each time interval in the storage unit 190, and may be used to analyze the real-time impression information corresponding to the advertising unit area.

On the other hand, the provider report information analysis unit 160 collects individual report information that is separately counted from an individual advertising provider 200 that has actually executed the advertisement in correspondence with the advertising unit area, and be used the report information for the real-time impression information analysis corresponding to the advertising unit area.

For example, the individual report information may include at least one of impression information, click information, and profit information counted by each advertising provider corresponding to the advertising unit area, the provider report information analysis unit 160 collects the individual report information and generates the real-time impression information for each advertising provider 200 corresponding to the advertising unit area.

In particular, the provider report information analysis unit 160 operates as a module for collecting information to be counted in the advertising provider 200, the provider report information analysis unit can collect the request count and the impression information received in the advertisement provider 200 according to the analysis method in the existing advertisement provider 200. However, as the information of each the advertising provider 200 is collected individually and passively by the advertising provider 200, there is a problem that the aggregation is inaccurate in the environment in which advertisements from a plurality of advertising providers 200 are provided in order as in the present environment.

Accordingly, the report providing unit 160 can be complimentarily combined to produce more accurate analysis information in the advertisement service providing apparatus 100 analyzed by the supplier call analysis module 153 and the report information collected and provided directly by each individual advertisement provider 200 according to the network call thereby greatly enhancing service quality and cost efficiency.

Here, information as the real-time effective cost per thousand impressions (ePCM) for each advertising provider, and the real-time impression information is analyzed and calculated according to the traffic information and reporting information collected and analyzed through the analysis unit 150 and 160.

Accordingly, the real-time impression information analyzed from each of the analysis unit 150 and 160 is processed through the report providing unit 170 to transmit through the advertisement medium 300. The report providing unit 170 provides the reporting information for each advertising provider 200 corresponding to each advertising unit area in real time based on the real-time impression information. Accordingly, the operator can grasp for an advertisement provided in a specific advertising unit area that which advertising provider is providing the advertisement at present, or how much effect exist at once.

In addition, in order to easily provide the reporting information through the advertising medium 300, it is provided the reporting layer corresponding to the advertising unit area to a predetermined area of the advertising medium, the real-time impression information is selectively provided through the reporting layer. In particular, the reporting layer may perform pop up function according to the user input, the function is provided through a graphical user interface that can be selectively provided for each advertising provider, by improving the user convenience. This will be described later with reference to FIG. 4 and FIG. 5.

Meanwhile, the storage unit 190 includes a storage medium for storing operation information of the control unit 110 and program information for operation of the above-described components. In particular, it may include a database for storing the advertisement area information, the traffic analysis information, and the reporting analysis information corresponding to the inventory information.

Figure 3:
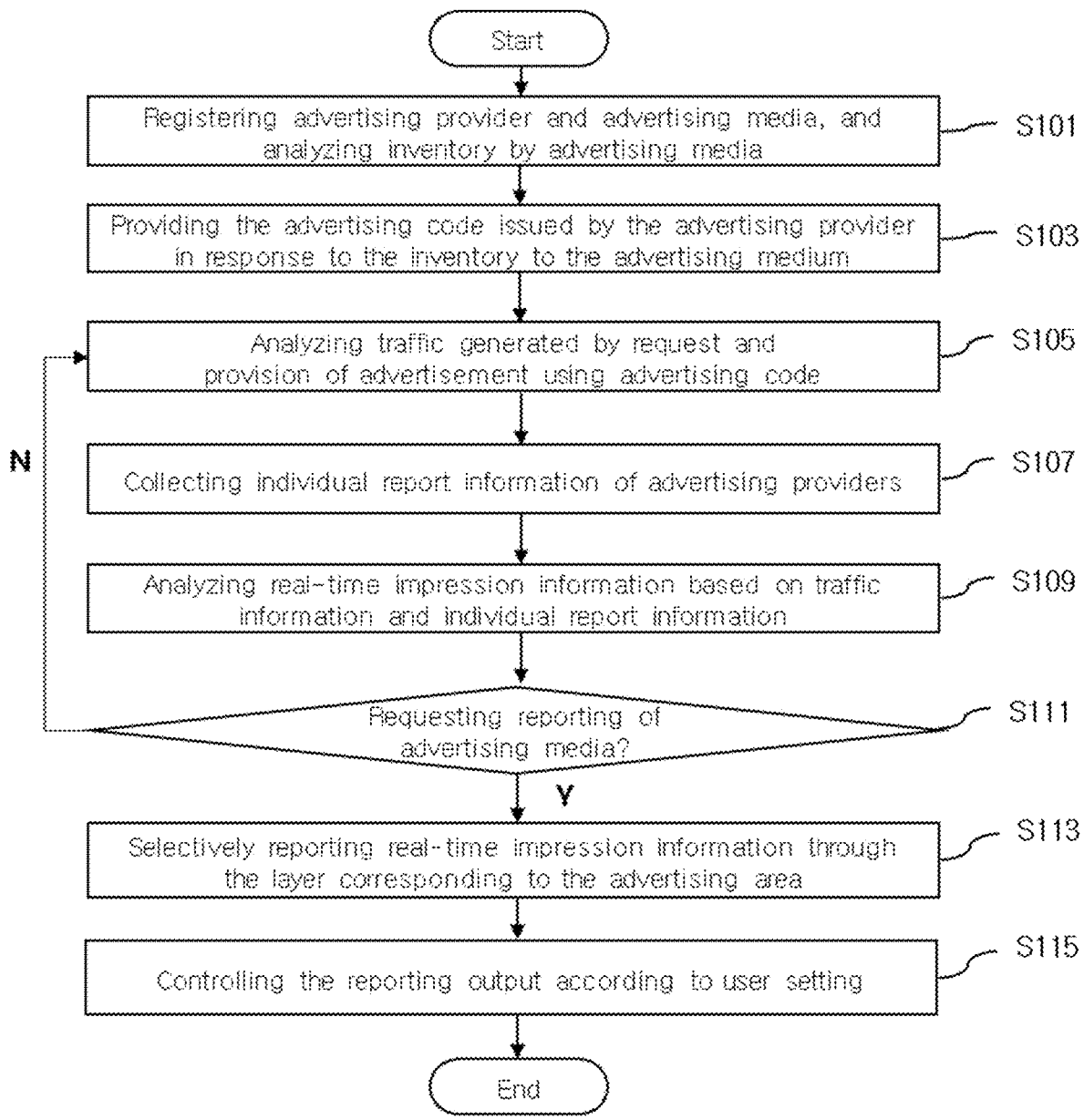
FIG. 3 is a flowchart illustrating an advertisement reporting service providing method according to a preferred embodiment of the present invention.

FIG. 3 is a flowchart illustrating an advertisement reporting service providing method according to a preferred embodiment of the present invention.

Referring to FIG. 3, the advertisement service providing apparatus 100 performs registration of the advertising provider 200 and the advertising medium 300, and analyses the inventory information corresponding to the advertising unit area for each the advertising medium 300 (S101).

In accordance with the advertisement request received through the advertisement transmission management unit 180, the advertisement service providing apparatus 100 provides the advertising code issued from the advertising provider 200 in response to the inventory to the advertising medium 300 (S103).

In addition, the advertisement service providing apparatus 100 may analyze the traffic information generated by request and provision of the advertisement using the advertising code by providing the advertising code through the traffic information analysis unit 150 (S105).

More specifically, the traffic information analysis unit 150 performs the analysis using at least one information among advertisement request traffic information using the advertising code from the advertising medium 300, advertisement response traffic information (or access information) provided by the advertisement service providing apparatus 100 to the advertising medium 300 in response to the advertisement request, and advertising provider call traffic information of the advertising medium 300 based on the response information.

In addition, the advertisement service providing apparatus 100 collects the individual report information of each advertising provider 200 through the provider report information analysis unit 160 (S107).

Here, the individual report information may further include advertisement request reception information and impression information for each the individual advertisement provider 200, which is difficult to collect in the traffic analysis information.

Then, the advertisement service providing apparatus 100 analyzes the real-time impression information based on the traffic information and the individual report information obtained from the analysis unit 150 and 160 (S109).

As described above, the real-time impression information may be ePCM information, and the real-time impression information may be finally calculated by the control unit 110 or the report providing unit 170

Then, the advertisement service providing apparatus 100 determines whether there is a reporting request corresponding to the advertising unit area from the advertising medium 300 (S111).

For example, the operator connected to the advertising medium 300 may request reporting of a specific advertising area through an interface provided in the advertising medium 300. For example, the advertising medium 300 may transmit the reporting request to the advertisement service providing apparatus 100 according to a user's specific input.

If there is the report request, the advertisement service providing apparatus 100 selectively reports the real-time impression information through the reporting layer of the advertising medium 300 corresponding to the advertising area (S113).

Here, the selective reporting of the real-time impression information will be more specifically described with reference to FIGS. 4 and 5.

Figure 4:
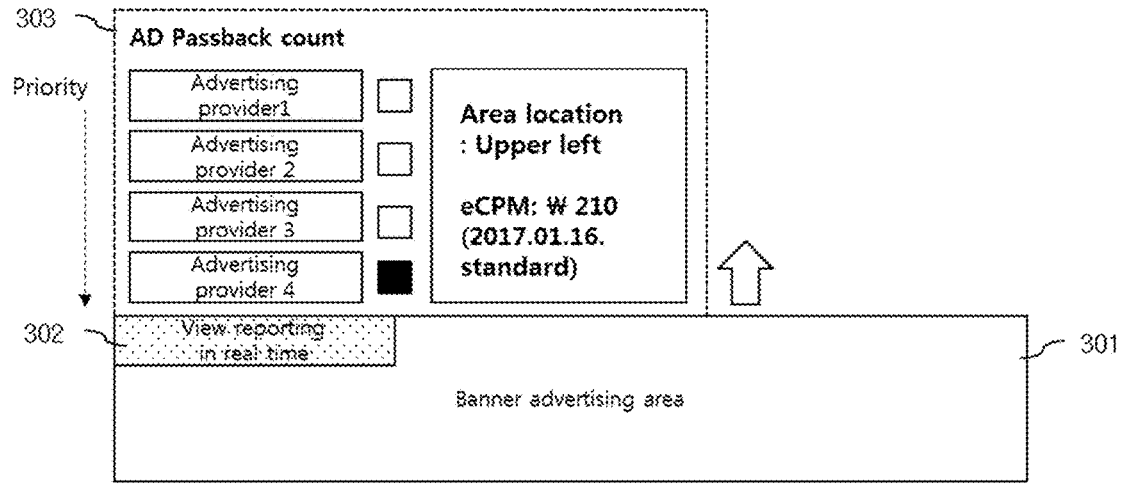
FIGS. 4 to 5 are views for explaining a reporting layer interface provided through an advertising medium according to a preferred embodiment of the present invention
Figure 5:

FIGS. 4 to 5 are views for explaining the reporting layer interface provided through the advertising medium according to the preferred embodiment of the present invention Referring to FIG. 4, the advertising medium 300 may be provided in the form of the web page, the banner advertising area 301 on the advertising medium 300 may correspond to the advertising unit area according to the embodiment of the present invention.

In providing the service according to the embodiment of the present invention through the user interface, the existing banner advertisement generally provides information of a single advertising provider 200 in the form of an icon, and new service corresponding to a plurality of advertising providers 200 may not be available at present.

Thus, according to an embodiment of the present invention, the real-time reporting view interface 302 may be provided at a predetermined location in the banner advertising area. When there is the user click input to the real-time reporting view interface 302, the reporting layer 303 may be provided to the user in a form the pop-up function to the top of the advertising area.

The real-time reporting view interface 302 may be displayed to the user only when the manager, operator, or the like of the web page accesses the web page. To this end, the advertisement service providing apparatus 100, provides the real-time reporting view interface 302, the advertisement service providing apparatus may check the browser access information and control the real-time reporting view interface 302 to be displayed in the banner advertising area only when the manager identification information is included in the access information. The browser connection information may be, for example, cookie information and may include the user identification information. Accordingly, a third party or a general user may not easily confirm information of the advertising provider, thereby reinforcing security for preventing of information leakage.

The real-time reporting view interface 302 may be provided in the advertising unit area or an adjacent area in the form of images, marks, icons, and etc. The reporting layer 303 may be displayed in popped up function on the advertising unit area, or may be displayed at a position adjacent to the advertising unit area.

For example, the reporting layer 303 may vary depending on the location and size of the advertising unit area. When the advertising unit area is located at the top or bottom of the web page of the advertising medium 300, the reporting layer 303 may be impressed at the bottom or top of the advertising unit area. Also, depending on the size of the advertising unit area, the advertisement may be selectively impressed in the left, right, top, and bottom direction.

The impression priority information for each advertising provider 200 may be displayed in the reporting layer 303. Each advertising unit area may be assigned an impression priority for a plurality of advertising providers 200. As shown in FIG. 4, the advertisement providers 200 are listed according to their exposure priorities, and numbers 1, 2, 3, and 4, meaning an order, may be also displayed together. Accordingly, the manager may check the real-time advertisement efficiency for each advertising provider 200 along with the priorities of the advertising provider 200 for the current banner advertising area.

In addition, the advertisement service providing apparatus 100 may provide the setting function for the reporting layer 303, and the reporting output control according to the user setting is enabled as shown in FIG. 3 (S115).

In the reporting layer 303, impression priority information for each advertising provider 200 may be displayed.

Each advertising unit area may be assigned an impression priority for a plurality of advertising providers 200.

In addition, the priority and exposure information for each advertising provider corresponding to the advertising unit area selected by the current user through the reporting layer 303 may be provided in real time, and performance information such as eCPM may be also provided together. In FIG.

4, location information of the advertising unit area together with a specific day reference eCPM is provided through the reporting layer 303.

Meanwhile, a second reporting layer 304 according to another embodiment of the present invention is shown in FIG. 5.

The second reporting layer 304 according to another embodiment of the present invention may include a comprehensive reporting layer corresponding to a plurality of advertising unit areas on a specific web page of the advertising medium 300.

As shown in FIG. 5, the comprehensive reporting layer totally collects the advertising unit areas found on the specific web page, and provides the inventory information for each advertising unit area and the real-time impression information (average eCPM, etc.) corresponding to the inventory information to each advertising provider. Accordingly, the comprehensive report layer may further include a variety of reporting information than the reporting layer 303 through the real-time reporting view interface 302 described above.

Then, the user can select a specific advertising provider, and selectively check the impression priority and advertisement effect of each advertising provider.

Accordingly, the user can check the currently impressed advertisement and the area effect to judge the order or replacement of the advertising provider.

In addition, the comprehensive reporting layer may be added with a login function so that it can be displayed to the user only when the manager or operator of the web page accesses the web page. Accordingly, the third party or the general user may not easily confirm information of an advertisement provider, thereby reinforcing security for preventing of information leakage.

Also, in case of the second reporting layer 304, it may be provided through an extension program module of the web browser that provides the advertisement medium 300. To this end, the advertisement service providing apparatus 100 may add the extension program of the web browser in which the advertising medium 300 is provided. The advertisement service providing apparatus 100 may provide the second reporting layer 304 through the web browser provided with the advertising medium 300 according to the extension program operation.

The method according to the present invention may be implemented as a program for execution on a computer and stored in a computer-readable recording medium. Examples of the computer-readable recording medium include a ROM, a RAM, a CD-ROM, a floppy disk, an optical data storage device, and the like.

The computer-readable recording medium may be distributed over a networked computer system so that computer readable code can be stored and executed in a distributed manner. And, functional programs, codes, and code segments for implementing the above method can be easily inferred by programmers of the technical field to which the present invention belongs.

While the present invention has been particularly shown and described with reference to exemplary embodiments thereof, it is to be understood that the invention is not limited to the disclosed exemplary embodiments, but, on the contrary, it will be understood by those skilled in the art that various changes and modifications may be made without departing from the spirit and scope of the present invention.

What is claimed is:

1. An operation method of an advertisement reporting service providing apparatus for providing an advertisement reporting service, the method comprising:
   acquiring inventory information corresponding to an advertising unit area of a web page based advertising medium;
   providing an advertising code issued from an advertising provider in response to the inventory information to the advertising unit area of the web page based advertising medium according to a predetermined impression priority, wherein the advertising provider is one of a plurality of advertising providers;
   analyzing real-time impression information for the advertising unit area using traffic information generated according to a provision of the advertising code; and
   reporting the real-time impression information corresponding to the advertising unit area through the web page based advertising medium,
   wherein the web page based advertising medium impresses an advertisement provided from the advertising provider by connecting to the advertising provider which receives a provider call based on the advertising code,
   wherein the reporting the real-time impression information comprises:
   providing impression priority information of the plurality of advertising providers to the advertising unit area with current advertising provider information for the impressed advertisement, through a reporting layer interface of the web page based advertising medium based on the real-time impression information.

2. The method of claim 1, wherein the analyzing the real-time impression information comprises analyzing the real-time impression information using advertising request traffic information received from the web page based advertising medium based on the advertising code.

3. The method of claim 2, wherein the analyzing real-time impression information further comprises analyzing the real-time impression information using advertising response traffic information provided to the web page based advertising medium.

4. The method of claim 3, wherein the analyzing real-time impression information further comprises analyzing the real-time impression information using advertising call information for the advertising provider of the web page based advertising medium.

5. The method of claim 4, wherein the analyzing real-time impression information further comprises:
   collecting individual report information received from each of the plurality of advertising providers; and
   producing the real-time impression information by complementarily combining the advertising call information with the individual report information for enhancing service quality and cost efficiency.

6. The method of claim 5, wherein the individual report information includes at least one of impression information, click information, and profit information counted by the each advertising provider corresponding to the advertising unit area.

7. The method of claim 1, wherein the reporting the real-time impression information further comprises:
   providing a reporting layer including performance information for the plurality of advertising providers corresponding to the advertising unit area to a predetermined area of the web page based advertising medium according to a user input; and selectively providing the real-time impression information for each of the plurality of advertising providers through the reporting layer.

8. The method of claim 7, wherein the selectively providing the real-time impression information provides real-time ePCM (effective cost per thousand impressions) information for the each advertising provider selected according to the user input through the reporting layer.

9. The method of claim 7, wherein the selectively providing the real-time impression information provides a comprehensive reporting layer corresponding to a plurality of advertising areas provided in a specific web page of the web page based advertising medium through an extension program module of a web browser providing the web page based advertising medium.

10. An apparatus for providing an advertisement reporting service, the apparatus comprising:
    an inventory management unit acquiring inventory information corresponding to an advertising unit area of a web page based advertising medium;
    an advertising transmission management unit providing an advertising code issued from an advertising provider in response to the inventory information to the advertising unit area of the web page based advertising medium according to a predetermined impression priority, wherein the advertising provider is one of a plurality of advertising providers;
    an analysis unit analyzing real-time impression information for the advertising unit area using traffic information generated according to a provision of the advertising code; and
    a report providing unit reporting the real-time impression information corresponding to the advertising unit area through the web page based advertising medium,
    wherein the advertising medium impresses an advertisement provided from the advertising provider by connecting to the advertising provider which receives a provider call based on the advertising code,
    wherein the report providing unit provides impression priority information of the plurality of advertising providers to the advertising unit area with current advertising provider information for the impressed advertisement, through a reporting layer interface of the web page based advertising medium based on the real-time impression information.

11. The apparatus of claim 10, wherein the analysis unit comprises a traffic information analysis unit for analyzing the real-time impression information using advertising request traffic information received from the web page based advertising medium, advertising response traffic information provided to the web page based advertising medium, and advertising call information of the web page based advertising medium for the advertising provider based on the advertising code.

12. The apparatus of claim 11, wherein the analysis unit further comprises a provider report information analysis unit for collecting individual report information received from each of the plurality of advertising providers, and producing the real-time impression information by complementarily combining the advertising call information with the individual report information for enhancing service quality and cost efficiency.

13. The apparatus of claim 12, wherein the individual report information includes at least one of impression information, click information, and profit information counted by the each advertising provider corresponding to the advertising unit area.

14. The apparatus of claim 10, wherein the report providing unit provides a reporting layer including performance information for the plurality of advertising providers corresponding to the advertising unit area to a predetermined area of the web page based advertising medium according to a user input, and selectively provides the real-time impression information for each of the plurality of advertising providers through the reporting layer.

15. The apparatus of claim 14, wherein the report providing unit provides real-time ePCM (effective cost per thousand impressions) information for the each advertising provider selected according to the user input through the reporting layer.

16. The apparatus of claim 14, wherein the report providing unit provides a comprehensive reporting layer corresponding to a plurality of advertising areas provided in a specific web page of the web page based advertising medium through an extension program module of a web browser providing the web page based advertising medium.

17. A computer program stored on a non-transitory computer readable recording medium for executing a method in a computer, the method comprising:
    acquiring inventory information corresponding to an advertising unit area of a web page based advertising medium;
    providing an advertising code issued from an advertising provider in response to the inventory information to the advertising unit area of the web page based advertising medium according to a predetermined impression priority, wherein the advertising provider is one of a plurality of advertising providers;
    analyzing real-time impression information for the advertising unit area using traffic information generated according to a provision of the advertising code; and
    reporting the real-time impression information corresponding to the advertising unit area through the web page based advertising medium,
    wherein the web page based advertising medium impresses an advertisement provided from the advertising provider by connecting to the advertising provider which receives a provider call based on the advertising code,
    wherein the reporting the real-time impression information comprises:
    providing impression priority information of the plurality of advertising providers to the advertising unit area with current advertising provider information for the impressed advertisement, through a reporting layer interface of the web page based advertising medium based on the real-time impression information.

* * * * *